United States Patent
Sternitzky

(10) Patent No.: US 6,758,163 B1
(45) Date of Patent: Jul. 6, 2004

(54) BIRD FEEDER

(76) Inventor: Jeffrey Sternitzky, 10061 E. Paseo San Rossendo, Tucson, AZ (US) 85747

( * ) Notice: Subject to any disclaimer, the term of this patent is extended or adjusted under 35 U.S.C. 154(b) by 0 days.

(21) Appl. No.: 10/656,759

(22) Filed: Sep. 8, 2003

(51) Int. Cl.$^7$ .............................................. A01K 05/00
(52) U.S. Cl. .................... 119/51.11; 119/56.1; 119/464; 119/477
(58) Field of Search ........................... 119/51.04, 51.11, 119/56.1, 57.1, 57.92, 429, 464, 467, 477, 454, 456, 469; 221/9, 13

(56) References Cited

U.S. PATENT DOCUMENTS

| | | | |
|---|---|---|---|
| 2,699,752 A | * | 1/1955 | Reyes ........................ 119/464 |
| 3,376,856 A | | 4/1968 | Crippen |
| 3,962,997 A | | 6/1976 | Ruth |
| D270,011 S | | 8/1983 | Gillard et al. |
| 4,665,862 A | | 5/1987 | Pichford, Jr. |
| 4,964,535 A | | 10/1990 | Curwen |
| 5,299,529 A | * | 4/1994 | Ramirez .................. 119/51.11 |
| 5,370,080 A | | 12/1994 | Koepp |
| 5,771,838 A | * | 6/1998 | Bloom et al. ............... 119/52.2 |
| 6,135,056 A | * | 10/2000 | Kuo ........................ 119/51.11 |
| 6,367,417 B1 | * | 4/2002 | Gal et al. .................. 119/51.5 |
| 6,487,987 B1 | * | 12/2002 | Choi ......................... 119/51.5 |

\* cited by examiner

Primary Examiner—Michael J. Carone
Assistant Examiner—Kimberly S. Smith

(57) ABSTRACT

The bird feeder is a unique new birdcage attachment which provides bird owners the ability to automatically feed their birds at timed intervals. The unit could be manufactured in various sizes and colors and would consist of a hopper for storing birdseed, an exit funnel on the bottom, a user programmable electronic timing device, and a clear viewing panel on the side to determine when the seed reservoir had been depleted. The automatic feeder would also feature clamps or clips to make it easily attachable to the side of a birdcage. When the unit was enabled for feeding, birdseed would flow from the hopper, through the chute which would feature a motor driven rotating mill to ensure that the seed does not clump together, and out the exit funnel which is located above the bird's seed tray. The feeder would rely on battery power to drive the timer mechanism and the motor.

20 Claims, 4 Drawing Sheets

BIRD FEEDER

BACKGROUND OF THE INVENTION

1. Field of the Invention

The present invention relates to a bird feeder for use in connection with the task of feeding birds for commercial and personal breeders and owners. The bird feeder has particular utility in connection with automatically feeding birds at timed intervals, thereby providing a convenience and savings in time for the bird owner or breeder.

2. Description of the Prior Art

Bird feeders are desirable for reducing the amount of time required to feed birds as well as the frequency of times the feedings need to be repeated. For many years a variety of bird feeders have been available to the consumer. Many feeders are constructed such that a gravity fed container with holes, slits, screens, or other openings allows access to the food supply. This type of feeder allows contamination of the food since the birds can dig in the readily accessible food. In addition, one or more birds may search out a preferred type of seed, digging through the rest of the feed to find this variety.

The use of automatic feeders is known in the prior art. For example, U.S. Pat. No. 5,370,080 to Gregory R. Koepp discloses an automatic and timed birdfeeder. However, the Koepp '080 patent tends to dump all of the birdseed in a pile rather than spreading the feed out over a larger area for consumption by more birds, and additionally does not provide a means for easily relocating the device once it has been initially secured.

U.S. Pat. No. 3,962,997 to Arthur P. Ruth discloses an animal feeder that utilizes a storage bin with a chute that empties into a feeding bowl. However, the Ruth '997 patent makes no provision for electronic control of the feeder when the owner is not present; rather it relies on manual control of the motor each time the feeder is used. Additionally, the Ruth '997 device makes no provision for sealing off the hopper, allowing moisture, bugs, and other unwanted elements access to the feed. Thus, the freshness and integrity of the feed can not be preserved. Finally, the Ruth '997 patent makes no provision for easily relocating the device once it has been initially secured.

Similarly, U.S. Pat. No. 4,964,535 to Neil W. Curwen discloses a dispensing apparatus that has a horizontal tumbler which receives and dispenses pet food into a tray at the bottom of the device. However, the Curwen '535 patent makes it necessary for a bird to enter an enclosed area to feed, which does not allow the bird to fly to freedom if threatened. Furthermore, the Curwen '535 device makes no provision for easily attaching the device to and detaching it from a bird cage.

U.S. Pat. No. 4,665,862 to Robert L. Pitchford, Jr. discloses a timed automatic pet feed and water dispenser that uses a feed dispensing auger to provide feed to a dish or to mix the feed with water to produce a gravy blend to the dish. However, the addition of a water and feed mixer complicates the device and adds to the manufacturing cost, especially concerning birds since the feed must be kept dry. Additionally, the Pitchford, Jr. '862 patent makes no provision for easily attaching the device to and detaching it from a bird cage.

Likewise, U.S. Pat. No. Des. 270,011 to Gary L. Gillard and Benjamin F. Gillard discloses the ornamental design for a bird feeder. However, the Gillard, et al. '862 patent makes no provision for electronically controlled automatic feeding.

Lastly, U.S. Pat. No. 3,376,856 to Huston D. Crippen discloses an automatic stock feeder for delivering a measured quantity of feed to a bowl, trough, or the like. However, the Crippen '856 device is much larger than would be able to attach to a bird cage; thus it does not pertain to the present invention.

While the above-described devices fulfill their respective, particular objectives and requirements, the aforementioned patents do not describe a bird feeder that is easily attached to and detached from a conventional birdcage and that allows preset electronic control of the amount of food allotted per feeding and the frequency of feedings. The Koepp '080 patent dumps the birdseed in a pile rather than spreading the feed out over a larger area for consumption by a larger number of birds. Neither the Gillard, et al. '862 nor the Ruth '997 patent provide a means for electronically controlled automatic feeding. Additionally, the Ruth '997 device can not guarantee the integrity of the stored feed since it makes no provision for sealing off the hopper from moisture, bugs, and other unwanted elements. The Curwen '535, Pitchford, Jr. '862, and Crippen '856 patents are not useful as bird feeders. The Curwen '535 device makes it necessary for a bird to enter an enclosed area to feed, which does not allow the bird to fly to freedom if threatened. The addition of a water and feed mixer is not useful for birds in the Pitchford, Jr. '862 device since the feed must be kept dry for birds, and the Crippen '856 device is much larger than would be able to attach to a bird cage. Finally, none of the aforementioned devices provides a means for attaching the feeder to a birdcage and then easily detaching it for repositioning. Therefore, a need exists for a new and improved bird feeder that is easily attached to and detached from a conventional birdcage and that allows preset electronic control of the amount of food allotted per feeding and the frequency of feedings. In this regard, the present invention substantially fulfills this need. In this respect, the bird feeder according to the present invention substantially departs from the conventional concepts and designs of the prior art, and in doing so provides an apparatus primarily developed for the purpose of automatically feeding caged birds at timed intervals, thereby providing a convenience and savings in time for the bird owner or breeder.

SUMMARY OF THE INVENTION

In view of the foregoing disadvantages inherent in the known types of bird feeders now present in the prior art, the present invention provides an improved bird feeder, and overcomes the above-mentioned disadvantages and drawbacks of the prior art. As such, the general purpose of the present invention, which will be described subsequently in greater detail, is to provide a new and improved bird feeder which has all the advantages of the prior art mentioned heretofore and many novel features that result in a bird feeder which is not anticipated, rendered obvious, suggested, or even implied by the prior art, either alone or in any combination thereof To attain this, the present invention essentially comprises a rectangular housing with a central reservoir featuring a deployment means associated therewith formed of a mill vane having a remotely controlled motor means associated therewith, such that the housing includes a chute extensible therefrom, and wherein the housing is adapted for mounting to a wall or the side of a bird cage.

There have thus been outlined, rather broadly, the more important features of the invention in order that the detailed description thereof that follows may be better understood and in order that the present contribution to the art may be better appreciated.

The invention may also include a keypad and display unit which allows the user to preprogram the desired time intervals for feedings. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bird feeder that has all of the advantages of the prior art bird feeders and none of the disadvantages.

It is another object of the present invention to provide a new and improved bird feeder that may be easily and efficiently manufactured and marketed.

An even further object of the present invention is to provide a new and improved bird feeder that has a low cost of manufacture with regard to both materials and labor, and which accordingly is then susceptible of low prices of sale to the consuming public, thereby making such a bird feeder economically available to the buying public.

Still another object of the present invention is to provide a new bird feeder that provides in the apparatuses and methods of the prior art some of the advantages thereof, while simultaneously overcoming some of the disadvantages normally associated therewith.

Even still another object of the present invention is to provide a bird feeder for feeding birds at timed intervals. This allows the owner or caretaker to be absent from the premises without worrying about the health of the birds.

Yet another object of the present invention is to provide a bird feeder for feeding birds at preprogrammed intervals, which provides a convenience to the owner and results in a significant reduction in the amount of time required to care for the birds.

Lastly, it is an object of the present invention to provide a new and improved bird feeder for feeding birds at preprogrammed intervals, which provides a means for a commercial bird owner to attend to the needs of the birds without spending excessive amounts of time or labor on the task.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
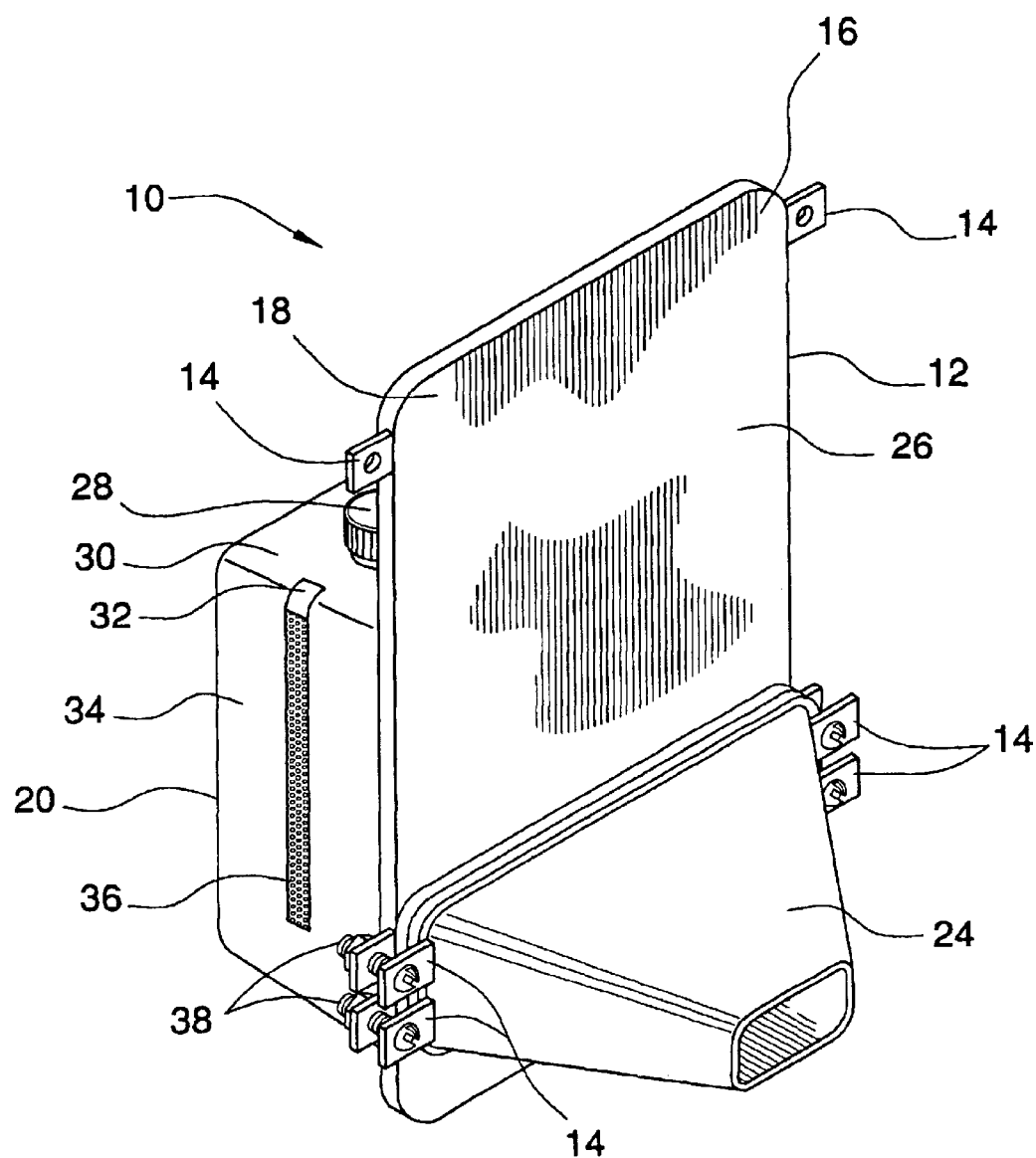
FIG. 1 is a left side perspective view of the preferred embodiment of the bird feeder constructed in accordance with the principles of the present invention.

Referring now to the drawings, and particularly to FIGS. 1–4, a preferred embodiment of the bird feeder of the present invention is shown and generally designated by the reference numeral 10.

In FIG. 1, a new and improved bird feeder 10 of the present invention for automatically feeding caged birds at timed intervals is illustrated and will be described. More particularly, the bird feeder 10 has a rectangular mounting panel 12 with a mounting bracket 14 attached at the top right and left corners, 16 and 18, respectively. These mounting brackets 14 could be used to mount the bird feeder 10 to the side of a bird cage or other vertical surface. In addition, the bird feeder 10 has a rectangular seed container 20 on the rear surface 22 (shown in FIG. 3) of the mounting panel 12 and a removable feed outlet funnel 24 extending horizontally forward from the front surface 26 of the mounting panel 12. The rectangular seed container 20 features a seed filler cap 28 on its top surface 30 and a clear viewing strip 32 along its left side 34 for determination of the level of the seed reservoir 36. The feed outlet funnel 24 is attached to the mounting panel 12 with a series of mounting brackets 14 and screws 38 located on both the mounting panel 12 and the feed outlet funnel 24.

Figure 2:
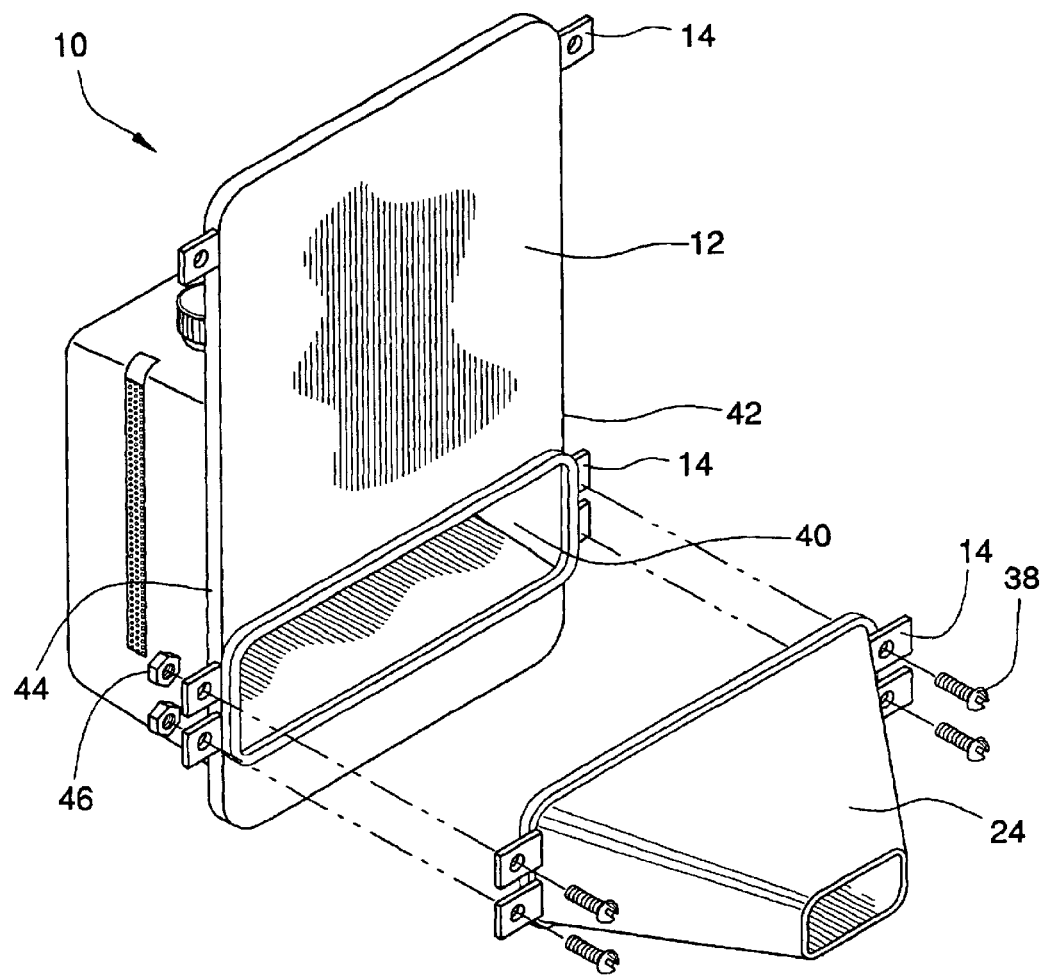
FIG. 2 is an exploded left side perspective view of the bird feeder of the present invention with the feed outlet funnel removed.

FIG. 2 shows an exploded left side perspective view of the bird feeder 10 of the present invention with the feed outlet funnel 24 removed. This view shows the seed slot 40 formed at the bottom of the seed container 20 which channels birdseed to the feed outlet funnel 24. Two mounting brackets 14 are connected on both the right and left sides, 42 and 44, respectively, of the mounting panel 12 to hold the feed outlet funnel 24 securely against this slot 40. A pair of mounting brackets 14 is also connected to each side of the feed outlet funnel 24. A mounting screw 38 passes through each set of aligned brackets 14 and is secured by a nut 46.

Figure 3:
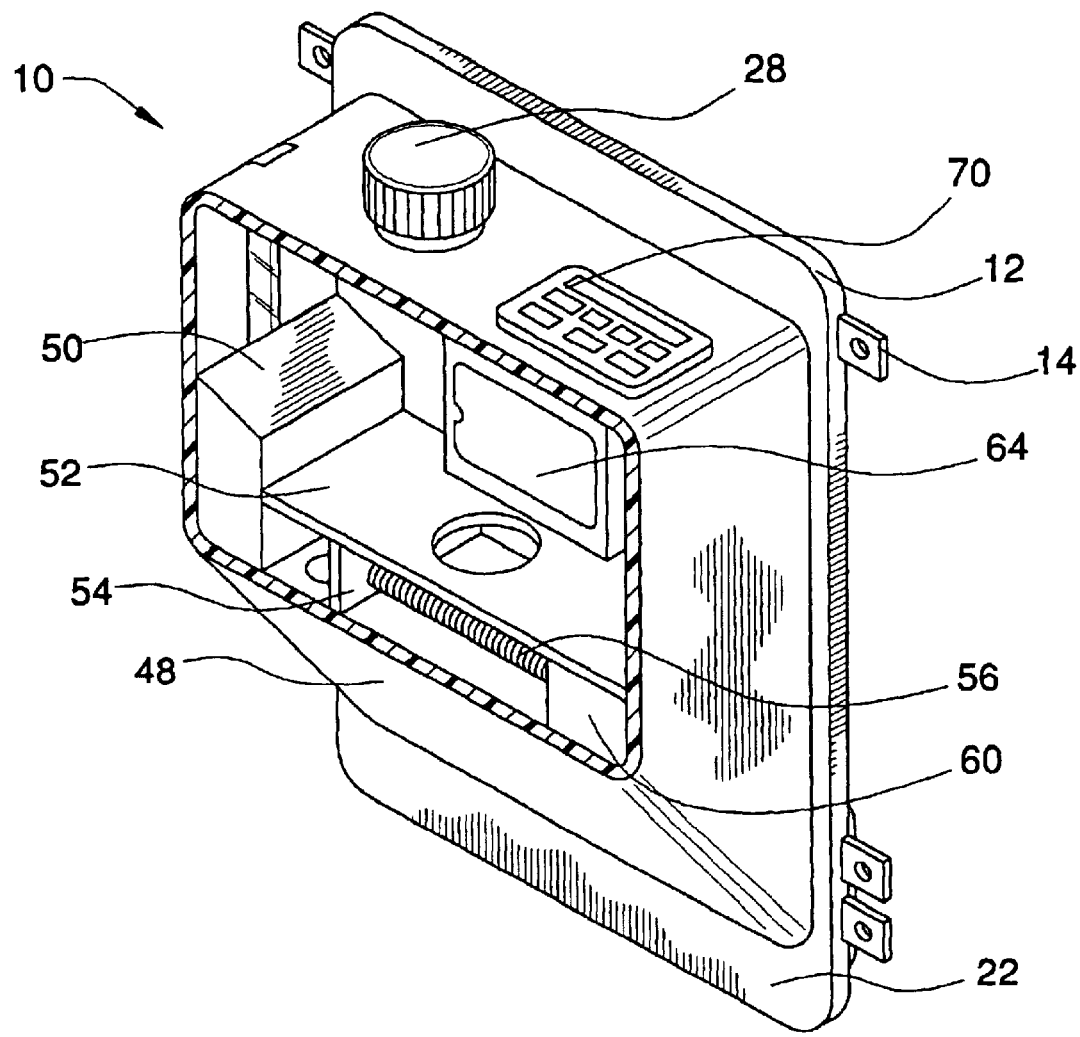
FIG. 3 is a rear perspective view of the bird feeder of the present invention.

FIG. 3 illustrates a rear perspective sectional view of the bird feeder 10 of the present invention. It can be seen from this view that the bottom 48 of the seed container 20 is angled downward forming a downward ramp in the seed slot 40 (shown in FIG. 2). Birdseed is placed in the seed container 20 through the seed filler cap 28. It lands on the filling ramp 50, which is angled downward to ensure the flow of the seed into the hopper 52 which stores the birdseed to be used in the feeding process. Seed moves from the hopper 52 through the chute 54 which contains a rotating mill 56 responsible for moving the seed into the seed slot 40 and keeping it from clumping together. The mill 56 is rotated by a small electric motor 58 (see FIG. 4) located in a motor housing 60. This motor 58 is connected by internal wiring 62 (see FIG. 4) to a second timer housing 64 containing a power source 66 (see FIG. 4) and a timer unit 68 (see FIG. 4) located in the upper right hand corner of the seed container 20. The power source 66 and timer unit 68 are wired to a display and keypad unit 70 located on the top of the seed container 20 and into which the user enters data dictating when the mill 56 will be rotated. The display and keypad unit 70 could also feature a light emitting diode for user notification purposes.

Figure 4:
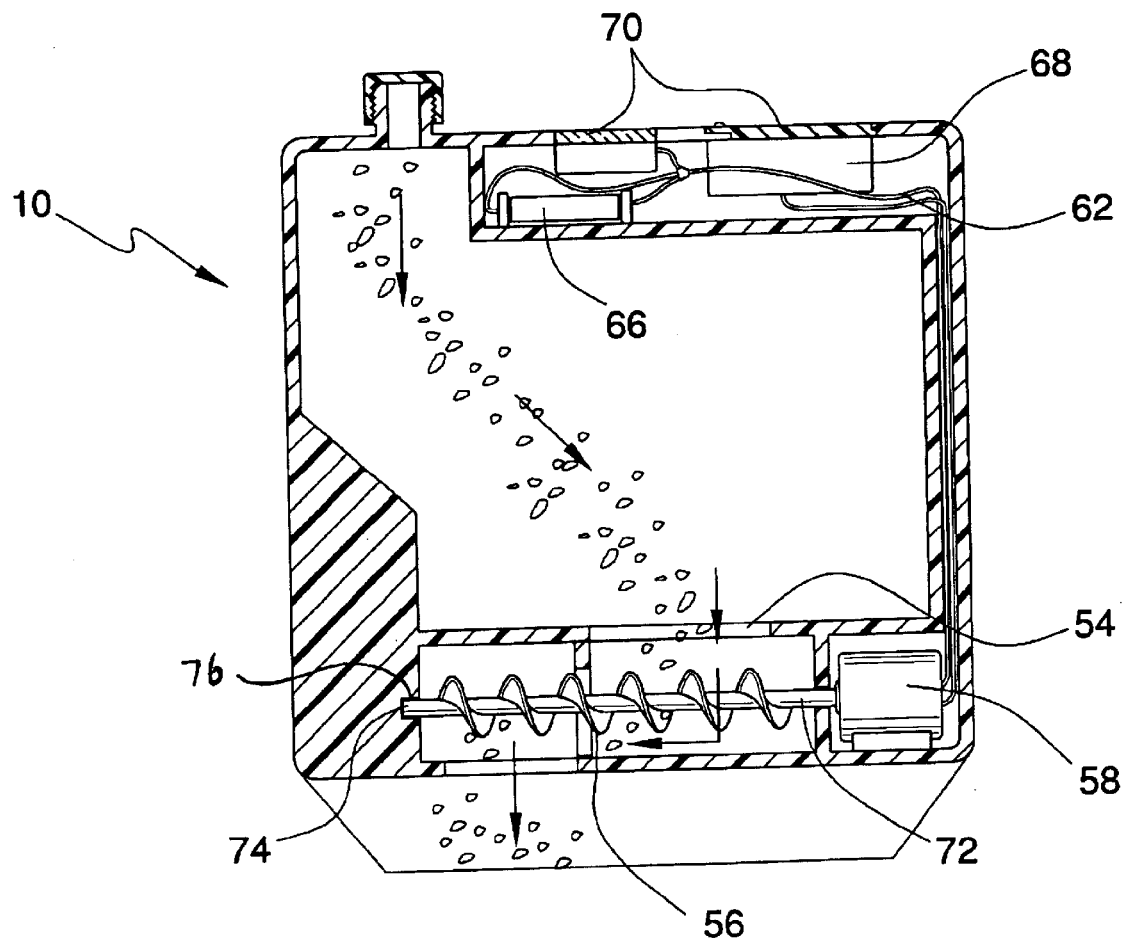
FIG. 4 is a rear cross sectional view of the seed container of the present invention.

FIG. 4 shows a rear cross sectional view of the seed container 20 of the bird feeder 10. The connections of the internal wiring 62 are more evident, as is the connection of the drive shaft 72 of the motor 58 to the shaft 74 of the mill 56. The opposite end of the mill shaft 74 is free to rotate in a notch 76 cut in the far end of the chute 54 which houses the mill 56.

In use, it can now be understood that, initially, a bird owner would mount the bird feeder on a bird cage. The owner could add birdseed before or after mounting the feeder by removing the seed filler cap and filling the hopper with birdseed. After securing the seed filler cap, a suitable feeding schedule would be entered on the timer display/keypad unit. When activated by the timer, the motor would actuate the mill, and seed would be dispensed from the feed outlet funnel. When deactivated, as determined by the data entered into the timer, the mill would stop rotating, and the birdseed would no longer be made available to the funnel. The owner could then attend to other pressing business knowing that his birds would be fed at the desired interval, occasionally refilling the feeder when the seed reservoir was low as could be observed through the viewing panel in the side of the feeder.

While a preferred embodiment of the bird feeder has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy, yet lightweight material such as rubber, cardboard, or a variety of wood may be used instead of the plastic described. And although automatic feeding of birds has been described, it should be appreciated that the bird feeder herein described is also suitable for automatically feeding a wide range of other animals. Furthermore, a wide variety of pet foods may be used instead of the birdseed described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bird feeder comprising:
    a hollow container having an approximately rectangular shape with an interior surface and an exterior surface defined by a front panel with an upper portion and a lower portion and formed with a horizontally rectangular aperture along the entire width of the lower portion, a rear panel parallel to said front panel, a right panel perpendicular to said front panel and joining said front panel to said rear panel, a left panel parallel to said right panel, a top formed with a flanged annular opening near said right panel and perpendicular to said front panel and joining said front panel to said rear panel and said left panel to said right panel, and a bottom that joins said front panel to said rear panel and that angles downward from said rear panel to said front panel;
    a flat mounting panel having a front surface, a rear surface, a right side, and a left side and formed with a transverse rectangular aperture and connected on said rear surface to said front panel of said container wherein said rectangular aperture is aligned with said rectangular aperture of said front panel of said container;
    a plurality of mounting brackets connected to said right and said left sides of said mounting panel;
    a ramp having a left side, a sloped top, and a right side and connected to said interior surface of said container wherein said right side of said ramp is connected to said right panel of said container and said sloped top is angled downward from said right panel of said container towards said bottom of said container;
    a flat, horizontal divider having a right edge, a center formed with a transverse aperture, and a left edge and connected to said ramp and said interior of said container wherein said right edge extends horizontally perpendicularly from said left side of said ramp and said left edge is perpendicularly connected to said left panel of said container to form a chute below said divider;
    an annular cap which cooperates with said flanged annular opening in said top of said container;
    a conveyor connected to said interior of said container to move feed from said interior of said container to said exterior of said container through said rectangular aperture located on said front panel of said container;
    a motor assembly connected to said interior of said container to actuate said conveyor;
    a plurality of electrical wiring having a first end and a second end and connected on said first end to said motor assembly; and
    a timing assembly connected to said second end of said electrical wiring.

2. The bird feeder of claim 1 wherein said annular opening in said top of said container and said cap are adapted for threaded coupling.

3. The bird feeder of claim 1 further comprising:
    a plurality of mounting flanges connected to said container for the purpose of mounting said bird feeder to a conventional bird cage.

4. The bird feeder of claim 1 wherein said container further comprises:
    a timing assembly compartment connected to said interior of said container and located near said top of said container and containing said timing assembly;

a battery compartment connected to said interior of said container and located near said top of said container; and a motor assembly compartment connected to said interior of said container and located near said bottom of said container and containing said motor assembly.

5. The bird feeder of claim 1 wherein said conveyor further comprises:

an elongated cylindrical shaft having a first end and a second end and connected on said first end to said chute formed by said divider and on said second end to said motor assembly;

an elongated rotating distribution wheel having a first end and a second end and formed with a longitudinal aperture and connected to said shaft wherein said shaft resides in said longitudinal aperture.

6. The bird feeder of claim 5 wherein said motor assembly further comprises:

a motor;

a drive shaft having a first end and a second end and connected on said first end to said motor and on said second end to said shaft of said distribution wheel;

a battery pack connected to said motor.

7. The bird feeder of claim 6 wherein said timing assembly further comprises:

a timer connected to said electrical wiring for the purpose of activating and deactivating said motor;

a keypad connected to said top of said container;

a display connected to said keypad and located on said top of said container;

a light emitting diode connected to said display;

a battery pack connected to said electrical wiring for the purpose of supplying power to said timer, said keypad, said display, and said light emitting diode.

8. The bird feeder of claim 1 wherein said right panel of said container is formed with a vertical slot and further comprises:

a transparent panel connected to said right side of said container wherein said panel is inserted into said vertical slot.

9. The bird feeder of claim 1 further comprising:

a funnel having a top, a bottom, a right side, and a left side and formed wherein said top of said funnel completely and snugly covers said rectangular opening in said front panel of said container when said funnel is mounted on said container;

a plurality of mounting brackets, each formed with a transverse aperture, and connected to said right and said left sides of said funnel wherein said plurality of mounting brackets is aligned with said plurality of mounting brackets on said mounting panel;

a plurality of mounting screws connected to said plurality of mounting brackets of said funnel and to said plurality of mounting brackets on said mounting panel wherein each said screw passes through one said mounting bracket on said funnel and through one aligned said mounting bracket on said mounting panel; and a plurality of nuts connected to said mounting screws.

10. The bird feeder of claim 9 wherein said funnel is shaped such that said top of said funnel is wider than said bottom and connected to said front surface of said mounting panel wherein birdseed will move from said top of said funnel to said bottom of said funnel due to the force of gravity.

11. A bird feeder comprising:

a hollow container having an approximately rectangular shape with an interior surface and an exterior surface defined by a front panel with an upper portion and a lower portion and formed with a horizontally rectangular aperture along the entire width of the lower portion, a rear panel parallel to said front panel, a right panel perpendicular to said front panel and joining said front panel to said rear panel, a left panel parallel to said right panel, a top formed with a flanged annular opening near said right panel and perpendicular to said front panel and joining said front panel to said rear panel and said left panel to said right panel , and a bottom that joins said front panel to said rear panel and that angles downward from said rear panel to said front panel;

a flat mounting panel having a front surface, a rear surface, a right side, and a left side and formed with a transverse rectangular aperture and connected on said rear surface to said front panel of said container wherein said rectangular aperture is aligned with said rectangular aperture of said front panel of said container;

a ramp having a left side, a sloped top, and a right side and connected to said interior surface of said container wherein said right side of said ramp is connected to said right panel of said container and said sloped top is angled downward from said right panel of said container towards said bottom of said container;

a flat, horizontal divider having a right edge, a center formed with a transverse aperture, and a left edge and connected to said ramp and said interior of said container wherein said right edge extends horizontally perpendicularly from said left side of said ramp and said left edge is perpendicularly connected to said left panel of said container to form a chute below said divider;

an annular cap which cooperates with said flanged annular opening in said top of said container;

a conveyor connected to said interior of said container to move feed from said interior of said container to said exterior of said container through said rectangular aperture located on said front panel of said container;

a motor assembly connected to said interior of said container to actuate said conveyor;

a plurality of electrical wiring having a first end and a second end and connected on said first end to said motor assembly;

a timing assembly connected to said second end of said electrical wiring a funnel having a top, a bottom, a right side, and a left side and formed wherein said top of said funnel completely and snugly covers said rectangular opening in said front panel of said container and removably connected to said container;

a plurality of mounting brackets connected to said right and said left sides of said mounting panel and to said right and said left sides of said funnel wherein said plurality of said brackets on said funnel are aligned with said plurality of brackets on said mounting panel;

a plurality of mounting screws connected to said plurality of mounting brackets of said funnel and to aligned said plurality of mounting brackets on said mounting panel wherein each said screw passes through one said mounting bracket on said funnel and through one aligned said mounting bracket on said mounting panel; and a plurality of nuts connected to said mounting screws.

12. The bird feeder of claim 11 wherein said annular opening in said top of said container and said cap are adapted for threaded coupling.

13. The bird feeder of claim 11 further comprising:

a plurality of mounting flanges connected to said container for the purpose of mounting said bird feeder to a conventional bird cage.

14. The bird feeder of claim 11 wherein said container further comprises:

a timing assembly compartment connected to said interior of said container and located near said top of said container and containing said timing assembly;

a battery compartment connected to said interior of said container and located near said top of said container; and a motor assembly compartment connected to said interior of said container and located near said bottom of said container and containing said motor assembly.

15. The bird feeder of claim 11 wherein said conveyor further comprises:

an elongated cylindrical shaft having a first end and a second end and connected on said first end to said chute formed by said divider and on said second end to said motor assembly;

an elongated rotating distribution wheel having a first end and a second end and formed with a longitudinal aperture and connected to said shaft wherein said shaft resides in said longitudinal aperture.

16. The bird feeder of claim 15 wherein said motor assembly further comprises:

a motor;

a drive shaft having a first end and a second end and connected on said first end to said motor and on said second end to said shaft of said distribution wheel;

a battery pack connected to said motor.

17. The bird feeder of claim 16 wherein said timing assembly further comprises:

a timer connected to said electrical wiring for the purpose of activating and deactivating said motor;

a keypad connected to said top of said container;

a display connected to said keypad and located on said top of said container;

a light emitting diode connected to said display;

a battery pack connected to said electrical wiring for the purpose of supplying power to said timer, said keypad, said display, and said light emitting diode.

18. The bird feeder of claim 11 wherein said right panel of said container is formed with a vertical slot and further comprises:

a viewing panel connected to said right side of said container wherein said panel is inserted into said vertical slot.

19. The bird feeder of claim 18 wherein said viewing panel is transparent.

20. The bird feeder of claim 11 wherein said funnel is shaped such that said top of said funnel is wider than said bottom and connected to said front surface of said mounting panel wherein birdseed will move from said top of said funnel to said bottom of said funnel due to the force of gravity.

* * * * *